Jan. 6, 1959 N. SAINT 2,867,395
AUXILIARY FUEL SYSTEM
Filed May 21, 1953

NATHANAEL SAINT
INVENTOR.

BY William W. Hasflyn

United States Patent Office 2,867,395
Patented Jan. 6, 1959

2,867,395

AUXILIARY FUEL SYSTEM

Nathanael Saint, Huntingdon Valley, Pa.

Application May 21, 1953, Serial No. 356,475

6 Claims. (Cl. 244—135)

This invention relates to fuel supply systems for aircraft engines, and more particularly to a completely independent auxiliary fuel supply system for delivering fuel from the fuel supply tank directly to the fuel-air induction system for the engine in flow quantities controlled by the pilot, in order to minimize engine power failure due to malfunctioning of the main fuel supply system.

It is the primary object of the invention to provide a novel means for supplying fuel to an internal combustion engine to keep the engine running should the main fuel system become inoperative for any reason.

It is another object of the invention to provide a completely independent auxiliary fuel supply system including simple control means for regulating the flow of fuel being supplied directly to the fuel-air induction system of an internal combustion engine from a fuel supply tank.

It is a further object of the invention to provide an improved auxiliary fuel system including a novel safety means for conducting delivered fuel away from the induction system when the engine is not running in order to minimize the fire hazard associated with the accumulation of raw fuel near a hot engine.

These and other objects and advantages of the present invention will be more fully understood by reference to the accompanying drawings wherein like numerals are applied to the corresponding parts in the several views.

Figure 1:
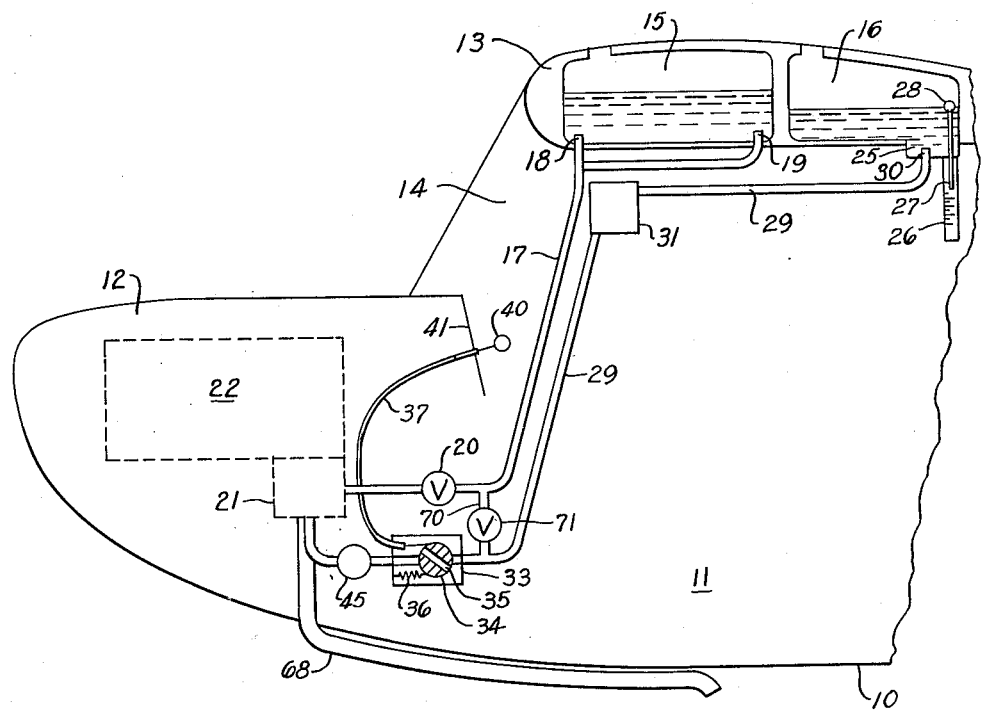
Figure 1 is a broken away view of an aircraft illustrating one arrangement of the component parts of my invention.

Referring now to Figure 1, the numeral 10 indicates the forward portion of a light aircraft which includes a fuselage portion 11, an engine nacelle 12, and wing portion 13 located directly over the pilot's compartment 14. A main fuel tank 15 and an auxiliary fuel tank 16 are positioned in the interior of wing portion 13. A main fuel line 17 which is connected into tank 15 by means of portions 18 and 19 runs downwardly from the tank 15 to a shut-off valve 20 and thence to the carburetor 21 for the engine 22. When the engine is running, fuel normally is delivered to the carburetor by gravity flow from the main tank 15.

The auxiliary fuel tank 16 which is positioned to the rear of the main fuel tank in wing section 13 has a sump 25 located at the rear lower portion thereof, and a glass viewing gauge 26 projects downwardly therefrom. A fuel-level stick 27 connected to a float 28 rides in the gauge 26 so that the pilot may know how much fuel remains in the auxiliary fuel tank 16. An auxiliary fuel line 29 runs downwardly from a port 30 in tank 16 and then forwardly to a small header tank 31 located beneath the main fuel tank 15.

The auxiliary fuel line 29 runs downwardly from the header tank 31 to a metering valve 33 located in close proximity to the carburetor 21. The metering valve 33 comprises a rotatable element 34 containing a duct or passage 35 which is normally biased out of communication with the auxiliary fuel line 29 by a spring 36, as shown. The passage 35 may, however, be rotated into communication with line 29 by means of a flexible cable 37 having one end connected to the rotatable element 34 and having an opposite end connected to a control knob 40 mounted on the panel 41 in the pilot's compartment. It may be seen that the pilot may control the amount of fuel flowing in the auxiliary fuel line 29 by pushing or pulling the control knob against the tension of the spring 36. The metering valve is normally spring loaded to Off position, to prevent fuel flow in the auxiliary line 29. Line 37 may also be connected to throttle control valve 64 as shown by dotted line 37a so as to approximately match the flow of fuel to the throttle setting controlling air induction into the engine. If this is done, control knob 40 becomes the pilot's throttle control. If this is done, a manually controlled shut off valve, spring-loaded to "Off," is inserted in the fuel line to prevent fuel flow through the auxiliary supply system when the main supply system is operating.

An automatic shut off valve 45 is inserted in the auxiliary fuel line 29 to eliminate any fire hazard which might result were the metering valve 33 or the manually controlled shut off valve (included in the fuel line when the metering valve is operatively connected to the throttle) left open.

Figure 2:
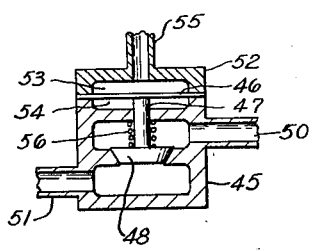
Figure 2 is a detailed view in cross section of the shut-off valve schematically illustrated in Figure 1.

One form of automatic shut-off valve is illustrated in Figure 2. The valve includes a diaphragm 46 connected to a stem 47 which is in turn connected to a valve head 48 which engages the beveled portion of wall 49 to prevent the flow of fuel from passage 50 to passage 51. The diaphragm is retained within a housing 52 having an upper chamber 53 and a lower chamber 54. The upper chamber is connected to the engine manifold, not shown, by means of line 55, and the lower chamber is connected to atmosphere by passage 55a so that when the engine is running the diaphragm will be forced upwardly by the pressure difference between chambers 53 and 54, compressing spring 56 which exerts a downward force on the valve head 48. Thus when the engine is running, fuel may flow in auxiliary fuel line 29, but when the engine is not running, fuel flow is arrested by the valve.

Figure 3:
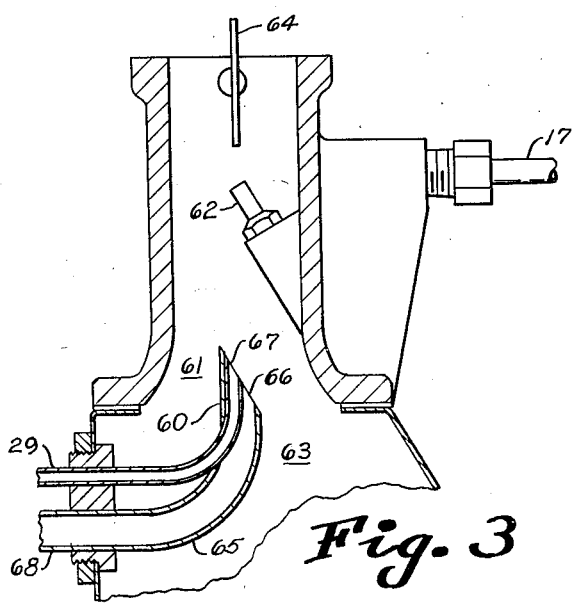
Figure 3 is a detailed view of a portion of the fuel-air induction system for the engine showing one arrangement of the fuel supplying jet and the safety means for conducting fuel away from the jet.

Metered fuel is delivered from auxiliary fuel line 29 directly into the fuel-air induction system of the engine 22, in order to keep the engine running should the main fuel supply system, including the carburetor, fail for any reason. Fuel may be delivered at any point in the air stream between the air intake and the engine valve; however, introduction of fuel close to the valves would require a division of the fuel supply line to several lines leading to points of introduction of the fuel into the manifold. As shown in Figure 3, the fuel is delivered to an emergency jet 60 installed in the carburetor venturi 61 so as to gain inherent or natural metering characteristics similar to those enjoyed by the main jet 62 in the primary fuel system. The auxiliary jet 60 enters the air intake passage 63 at a point adjacent the upstream end of the venturi 61, and projects downstream to deliver fuel to the air stream at a point within the venturi 61. In this case, the emergency jet 60 delivers fuel at a point in the venturi located upstream from the main jet 62 and the butterfly valve 64.

A walled duct 65 comprising a fuel trap or drain extends into the passage 63 adjacent the emergency jet 60 and has an opening 66 adjacent the mouth 67 of the jet 60. Duct 65 is provided in order to conduct raw fuel away from the jet 60 should it be inadvertently delivered thereto when the engine is not running. An overboard drain pipe 68 is connected to duct 65 to conduct the inadvertently delivered fuel away from the engine and dump it overboard to minimize the fire hazard.

In Figure 1, there is also illustrated a means for selectively conducting fuel from fuel line 29 only, or from both fuel lines 17 and 29 directly to the induction system for the engine, via metering valve 33. The means provided includes a branch fuel line 70 and a simple valve 71 connected in series therewith. The branch fuel line is connected between the fuel lines 17 and 29 at a point upstream from metering valve 33 and at a point upstream from valve 20 in line 17. When metering valve 33 is closed and valves 20 and 71 are open, fuel from both tanks may be delivered to the carburetor 21. When valve 20 is closed and valves 33 and 71 are open, fuel from both tanks may be delivered to the emergency fuel jet 60 via metering valve 33.

It will be noted that the emergency or auxiliary fuel system provided is completely independent of the main fuel system and provides a simple and practical means for supplying fuel in approximately correct quantities directly to the induction system of the engine in case of primary fuel system or carburetor failure.

I claim:

1. An improved dual fuel supply system on an aircraft having an engine and a wing at a higher level than the engine, said engine having a carburetor venturi and main fuel jet therein and having an enlarged intake manifold passage downstream of the carburetor venturi and main jet for conducting the air-fuel mixture directly to the engine cylinders, said fuel supply system comprising fuel tank means in the wing, a main fuel line leading from the tank means to said main jet, an auxiliary fuel line having an inlet at the fuel tank means and an unrestricted outlet in the air intake manifold downstream of the carburetor main jet and venturi and opening directly into said manifold passage, said inlet being at a higher elevation than said outlet so that fuel in said tank means will force fuel from said outlet into said passage in a steady stream independently of the functioning of said main jet and venturi, and a manually controllable metering valve in said auxiliary fuel line for controlling the delivery of auxiliary fuel to said manifold passage.

2. The invention as defined in claim 1 wherein said carburetor includes a manually controllable air throttle gate, and means interconnecting said throttle gate and metering valve so that both are simultaneously manually controllable to deliver more air and fuel to said passage when simultaneously opened.

3. The invention as defined in claim 2 including a by-pass line interconnecting said main fuel line with said auxiliary fuel line between the tank and said metering valve, and a manual control valve in said by-pass line.

4. The invention as defined in claim 3 in which said tank means includes a main fuel tank feeding said main line and an auxiliary fuel tank beside said main tank and feeding said auxiliary fuel line.

5. The invention as defined in claim 4 including a relatively small tank in said auxiliary line between said by-pass and said auxiliary tank and at a higher elevation than said line outlet.

6. The invention as defined in claim 4 including an overflow conduit having an intake adjacent the outlet of said auxiliary fuel line in said passage and having a discharge outside the aircraft and at a lower level than said conduit intake.

References Cited in the file of this patent

UNITED STATES PATENTS

| | | |
|---|---|---|
| Re. 22,447 | Hersey et al. | Feb. 29, 1944 |
| 1,022,027 | Hyde | Apr. 2, 1912 |
| 1,296,229 | Tampier | Mar. 4, 1919 |
| 1,448,752 | Kopf | Mar. 20, 1923 |
| 1,458,203 | Tanner | June 12, 1923 |
| 1,461,662 | Kawamura | July 10, 1923 |
| 1,581,595 | Osborne | Apr. 20, 1926 |
| 1,618,139 | Ryder | Feb. 15, 1927 |
| 1,784,747 | Peckelhoff | Dec. 9, 1930 |
| 1,841,046 | Mortenson et al. | Jan. 12, 1932 |
| 2,083,752 | Trussell | June 15, 1937 |
| 2,311,827 | Hansen | Feb. 23, 1943 |
| 2,356,200 | Bedard | Aug. 22, 1944 |
| 2,402,208 | Read | June 18, 1946 |
| 2,414,451 | Christensen | Jan. 21, 1947 |
| 2,573,724 | Neal | Nov. 6, 1951 |
| 2,582,389 | McDonnell | Jan. 15, 1952 |
| 2,694,561 | Rose | Nov. 16, 1954 |

FOREIGN PATENTS

| | | |
|---|---|---|
| 572,185 | France | Feb. 15, 1924 |